(12) United States Patent
Eakin

(10) Patent No.: US 11,503,800 B2
(45) Date of Patent: Nov. 22, 2022

(54) ANIMAL FEED MECHANISM WITH FEED AGITATOR ASSEMBLY

(71) Applicant: Osborne Industries, inc., Osborne, KS (US)

(72) Inventor: George R Eakin, Osborne, KS (US)

(73) Assignee: Osborne Industries Inc., Osborne, KS (US)

( * ) Notice: Subject to any disclaimer, the term of this patent is extended or adjusted under 35 U.S.C. 154(b) by 289 days.

(21) Appl. No.: 16/889,650

(22) Filed: Jun. 1, 2020

(65) Prior Publication Data

US 2020/0375146 A1 Dec. 3, 2020

Related U.S. Application Data

(60) Provisional application No. 62/854,798, filed on May 30, 2019.

(51) Int. Cl.
*A01K 5/00* (2006.01)
*A01K 5/02* (2006.01)
*B65D 88/68* (2006.01)

(52) U.S. Cl.
CPC ............ *A01K 5/0225* (2013.01); *B65D 88/68* (2013.01)

(58) Field of Classification Search
CPC .... A01K 5/0225; A01K 5/0258; A01K 5/002; B65D 88/26; B65D 88/28; B65D 88/68
See application file for complete search history.

(56) References Cited

U.S. PATENT DOCUMENTS

| | | | |
|---|---|---|---|
| 8,096,265 B1 * | 1/2012 | Wisecarver | A01K 5/0225 119/56.2 |
| 8,573,829 B2 | 11/2013 | Gordon | |
| 9,144,226 B2 | 9/2015 | Gordon | |
| 2020/0290054 A1 * | 9/2020 | Johnson | B02C 7/14 |

* cited by examiner

*Primary Examiner* — Monica L Perry
(74) *Attorney, Agent, or Firm* — Jeffrey L. Thompson; Thompson Law, P.A.

(57) ABSTRACT

An animal feed mechanism with feed agitator assembly includes a feed bin, a funnel-shaped boot attached to a bottom of the feed bin, an agitator system installed in the boot, and a conveying device for conveying feed out of the boot. The agitator system is installed using boot mount brackets attached to end walls of the boot, and holes cut in the sidewalls of the boot after the boot mount brackets are attached. The boot mount brackets each include a lower ledge with a sufficient length to block the free flow of feed out of the holes cut in the sidewalls of the boot due to the angle of repose of the feed. The agitator system includes a motor driven agitator shaft with radial projections that can be inserted through the holes cut in the boot and supported at each end by bearings attached to the boot mount brackets.

19 Claims, 8 Drawing Sheets

ANIMAL FEED MECHANISM WITH FEED AGITATOR ASSEMBLY

RELATED APPLICATIONS

This application claims the benefit of U.S. Provisional Patent Application No. 62/854,798 filed on May 30, 2019. The entire content of this related application is incorporated herein by reference.

BACKGROUND OF THE INVENTION

Field of the Invention

The present invention relates generally to animal feeding mechanisms, and in particular, to teed mechanisms with agitator assemblies for breaking up clumps of feed.

Description of the Related Art

Ground grains for livestock feeding have been placed in silos or bulk bins for many years. These bulk bins are used to temporarily store feed while it is distributed to the proper feeding location during livestock growing cycles. The feed is placed into the bulk bin via a transportation truck that elevates the feed to the top of the bulk bin and discharges the feed to fill the bulk bin. The feed placed into the feed bin will remain in the confines of the feed bin until it is removed from the opening located at the bottom of the feed bin.

In typical applications, the bottom opening of the feed bin is connected to a funnel-shaped boot which is attached to a mechanical unloading box that contains a helical auger or other conveying device. The feed will flow to the bottom opening by gravity when the bottom opening allows feed to be removed from the boot area. This process of loading and unloading a feed bin has many challenges depending on the type of feed placed into the feed bin and the environmental conditions exerted on the feed bin.

The primary feed flow challenge is blockages that occur in the boot area prior to entry into the unloading box. The blockage is typically a mass of feed grain that has coagulated together to form balls or clumps of grain. The coagulation of the grain is the result of high moisture feed that is rich in fat, oil, or other fermented by-products. This condition is exacerbated during high heat seasons or during cold periods where warm and wet/moisture laden feed condenses water inside the feed bin along the cold outer wall. This water will then be absorbed by the feed allowing coagulation with adjacent feed.

The large balls or clumps of feed will flow to the bottom of the feed bin and then will enter into the boot area where blockage of additional feed flow will occur. The auger or conveying device will transport the feed from one end of the unloading box to the outlet of the unloading box and into the appropriate feeding location. The transport of the feed by the auger or conveying device causes a situation where the feed typically flows to a single location at the beginning of the auger or conveying device where there is a void and feed can flow to fill this void. However, after this void is filled, no additional amount of feed can be transported. Thus, all of the larger balls or clumps of grain will be moved to an area where feed flow is minimal. This will continue to occur until the entire boot area is blocked and no feed can flow to the auger or conveying device.

The problem with this feed blockage has been solved by placement of an agitating mechanism into the boot area that more uniformly drives the flow of feed equally downward. The rotating motion of the agitating mechanism also breaks up the ball or clumps of feed to prevent additional blockage from occurring. This innovative feed agitator was developed by Timothy J. Gordon, Lansing, Iowa and subsequently received U.S. Pat. No. 9,144,226.

The Gordon mechanical agitator solved the feed ball and clumping problems typically experienced by high moisture feed and environmental conditions. However, the mechanism suffers from an installation problem. This problem is created by the fact that installation of the device must occur when the feed bin is completely empty. The feed bin must be empty owing to the situation that there is no means to prevent the feed from continuously flowing out of the feed bin during installation of the feed agitator. Therefore, the installation of the Gordon agitating mechanism can only be performed on newly constructed feed bins or feed bins that have been completely emptied. The latter condition is not normally possible on operating farms since the feed bins are needed to keep the livestock continuously fed. Timing to perform any such work will be difficult to achieve given the personnel, livestock feed schedule, tools, and unexpected installation problems that inevitably happen.

Thus, there is a need in the industry for an improved animal feed mechanism with a feed agitator assemblythat can be installed without emptying a feed bin.

SUMMARY OF THE INVENTION

The present invention solves the installation problems of prior art feed agitator systems and reduces the time required to install the mechanical feed agitator. The present invention also allows the mechanical feed agitator to be installed on both straight and 30 degree taper boots that are traditionally found on feed bins, whereas the prior art is only capable of being installed on straight boot assemblies.

An object of the present invention is to provide an installation system for a feed agitator that allows the feed agitator to be installed in a boot below a feed bin without first emptying the feed bin.

A further object of the present invention is to provide an installation system for a feed agitator that prevents feed from continuously free flowing out of the feed boot during installation.

A further object of the present invention is to provide an installation system for a feed agitator that can be used with both straight and angled boot assemblies.

These and other objects of the present invention are provided by an animal feed mechanism with a feed agitator assembly that includes a feed bin, a funnel-shaped boot attached to a bottom of the feed bin, an agitator system installed in the boot, and a conveying device for conveying feed out of the boot. The agitator system is installed using boot mount brackets attached to end walls of the boot, and holes cut in the sidewalls of the boot after the boot mount brackets are attached by using the boot mount brackets as a cutting guide. The boot mount brackets each include a lower ledge with a sufficient length to block the free flow of feed out of the holes cut in the sidewalls of the boot due to the angle of repose of the feed. The agitator system includes a motor driven agitator shaft with radial projections that can be inserted through the holes cut in the boot and supported at each end by bearings attached to the boot mount brackets.

According to one aspect of the present invention, an animal feed mechanism is provided for handling feed, comprising: a feed bin having a bottom opening; a funnel-shaped boot connected to the feed bin and arranged to receive feed from the bottom opening of the feed bin, the funnel-shaped boot comprising first and second end walls; a conveying device arranged below the funnel-shaped boot to convey feed that flows from the feed bin through the funnel-shaped boot; an agitator assembly for breaking up clumps of feed to prevent blockage from occurring, the agitator assembly comprising a feed agitator shaft with radial protrusions that extend to a first diameter; and a mounting system for mounting the feed agitator assembly to the funnel-shaped boot. The mounting system comprises a first boot mount bracket attached to the first end wall of the funnel-shaped boot, and a first installation opening cut through the first end wall of the funnel-shaped boot. The first installation opening is large enough to insert the feed agitator shaft with radial protrusions through the first end wall and into the funnel-shaped boot. The first boot mount bracket comprises a lower ledge located below the first installation opening and extending from the first end wall a sufficient length to stop ground feed from free flowing from the first installation opening so that the mounting system can be installed to the funnel-shaped boot without first emptying the feed bin.

According to another aspect of the present invention, a method of installing a feed agitator assembly to an animal feed mechanism is provided, comprising: providing a feed bin having a bottom opening, a funnel-shaped boot connected to the feed bin and arranged to receive feed from the bottom opening of the feed bin, the funnel-shaped boot comprising first and second end walls, and a conveying device arranged below the funnel-shaped boot to convey feed out of the funnel-shaped boot; attaching a first boot mount bracket to the first end wall, the first boot mount bracket having a first lower ledge; cutting a first hole through the first end wall of the funnel-shaped boot with the first lower ledge positioned below the first hole and extending outwardly from the first end wall a sufficient length to stop ground feed from free flowing from the first hole after the first hole is cut; inserting a feed agitator shaft with radial protrusions through the first hole so that the radial protrusions are positioned between the first and second end walls, and a proximal end of the feed agitator shaft extends out of the first hole; supporting the proximal end of the feed agitator shaft with a proximal end bearing assembly fastened to a first mounting bracket cap on the first boot mount bracket; and coupling a drive motor assembly to the feed agitator shaft to rotate the feed agitator shaft about a longitudinal axis to break up clumps of feed within the funnel-shaped boot to prevent blockage from occurring.

According to another aspect of the present invention, a system for handling granular material is provided, comprising: a housing comprising a wall; a mechanism adapted to be inserted through the wall of the housing; and a mounting system for mounting the mechanism. The mounting system comprises a structure with a lower ledge attached to the wall of the housing, and an installation opening through the wall of the housing for inserting the mechanism. The lower ledge is located below the installation opening and extends from the wall at least far enough to allow a slope of granular material that flows out of the installation opening onto the lower edge to equal an angle of repose of the granular material.

Numerous other objects of the present invention will be apparent to those skilled in this art from the following description wherein there is shown and described embodiments of the present invention, simply by way of illustration of some of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the present invention is made with reference to the accompanying drawings.

In the drawings.

DETAILED DESCRIPTION OF THE INVENTION

An animal feed mechanism with a feed agitator assembly according to embodiments of the present invention will be described in detail with reference to FIGS. 1 to 8 of the accompanying drawings.

Figure 1:
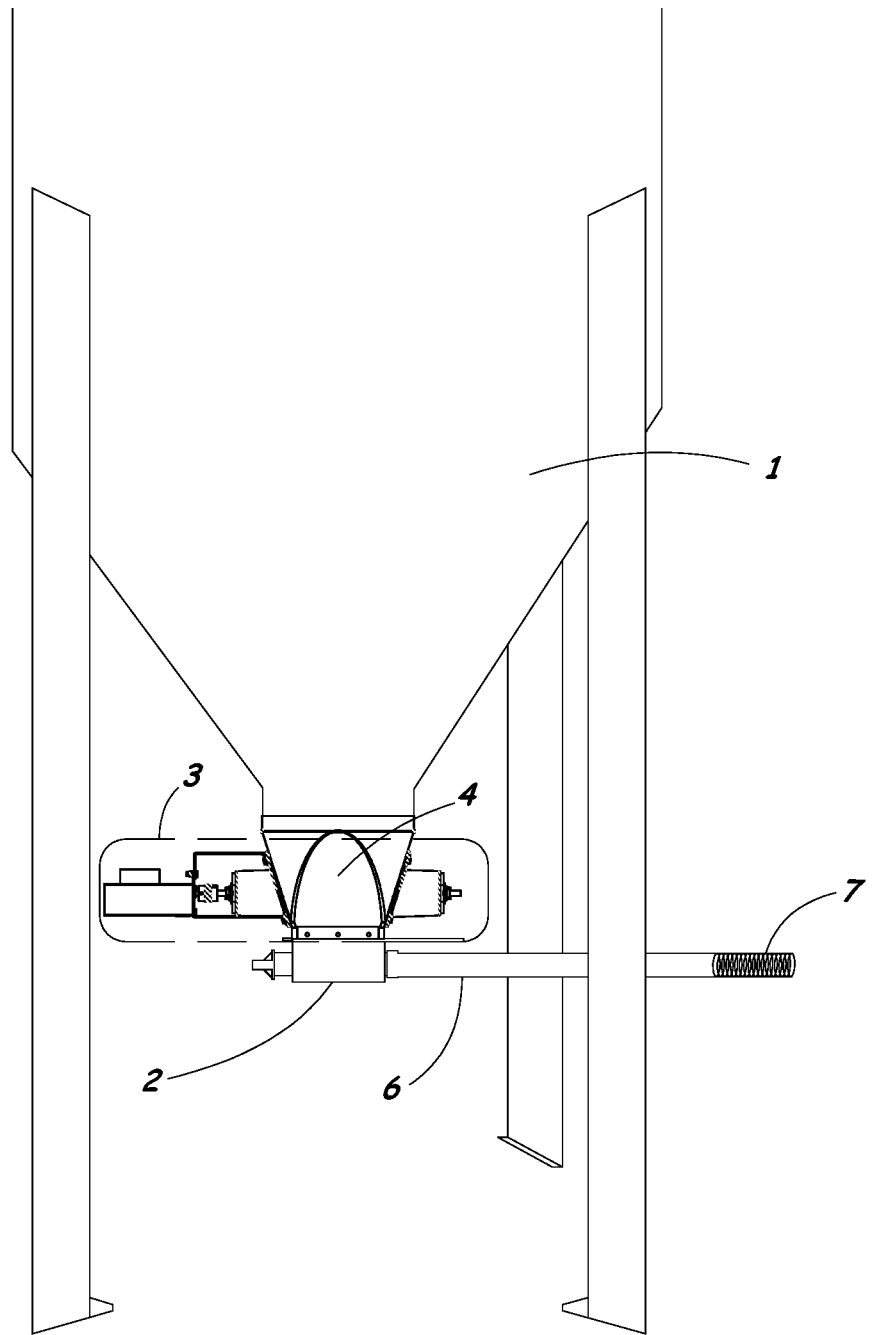
FIG. 1 is an elevation view of a feed bin with a bottom unloader that includes a straight boot with an agitating mechanism according to a first embodiment of the invention.
Figure 4:
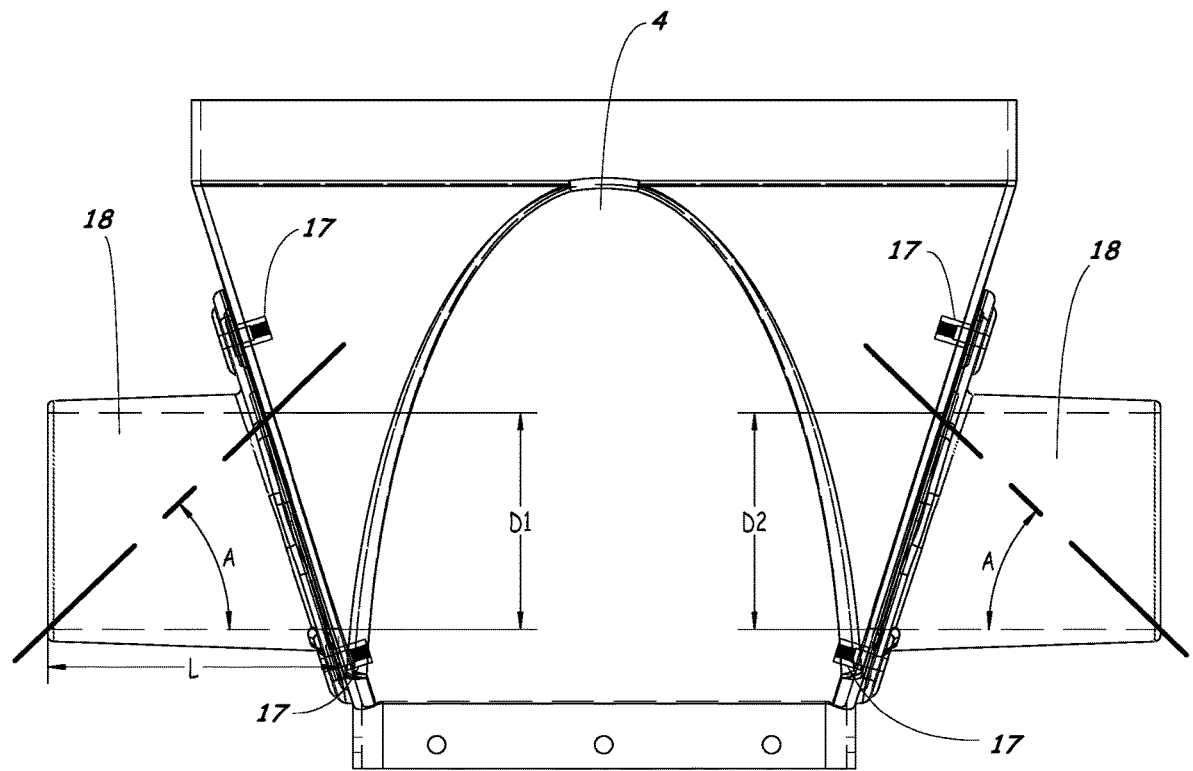
FIG. 4 is a detail view showing the agitator mounting system attached to the straight boot for installing the agitating mechanism in the first embodiment.
Figure 5:
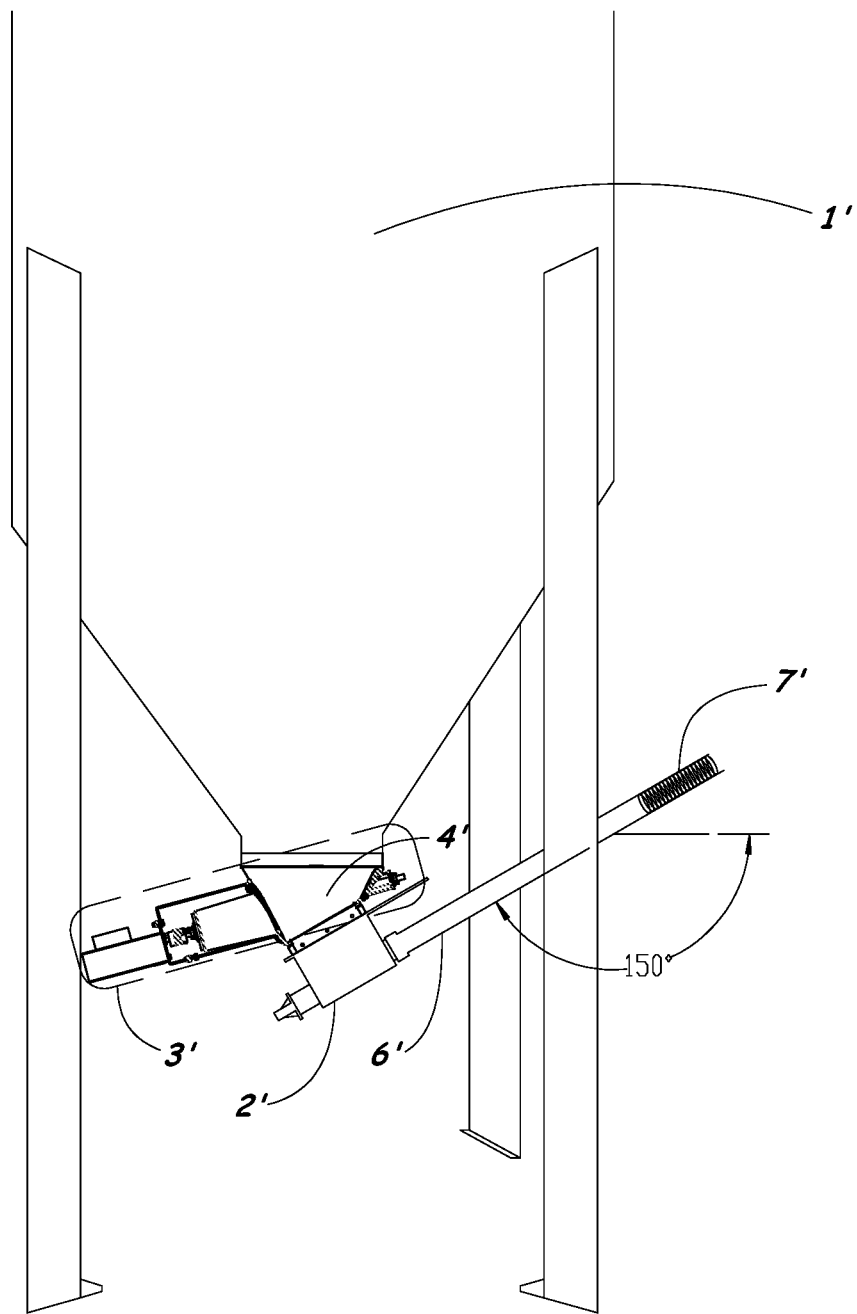
FIG. 5 is an elevation view of a feed bin with a bottom unloader that includes an angled boot with an agitating mechanism according to a second embodiment of the invention.

FIGS. 1 and 5 show feed bins 1, 1' having bottom openings with tapered feed bin boots 4, 4' arranged to receive feed from the bottom openings of the feed bins 1, 1'. The boots 4, 4' provide funnel-shaped housings that promote smooth flow of feed from the bins 1, 1' to the feed delivery systems. The feed delivery systems include unloaders 2, 2' positioned below the boots 4, 4' containing the auger or conveying devices 7, 7' that convey feed from the bins 1, 1'. The feed bin 1 shown in FIG. 1 is assembled with a straight boot 4 with the auger or conveying device 7 extending horizontally, while the feed bin 1' shown in FIG. 5 is assembled with an angled boot 4' to accommodate an auger or conveying device 7' extending at an upward angle (e.g., 30 degrees relative to horizontal). The first embodiment with the straight boot 4, as shown in FIGS. 1 to 4, will be described first.

First Embodiment—Straight Boot

As shown in FIGS. 1 to 4, the straight boot 4 is a tapered or funnel-shaped boot, which is also referred to in this application as a funnel-shaped housing. The straight boot 4 is connected directly to the unloader box 2 that contains the auger tube 6 and auger or conveying device 7. The feed agitator mechanism 3 is attached to the straight boot 4 to mechanically agitate balls or clumps of feed 8 flowing inside of the feed bin 1 into the straight boot 4. The feed agitator mechanism includes a feed agitator shaft 15 with radial protrusions 15a spaced along a length of the shaft 15. Upon rotation of the shaft 15, the radial protrusions 15a are also rotated with the shaft 15 to aid in breaking up balls or clumps of feed 8 within the boot 4.

Figure 2:
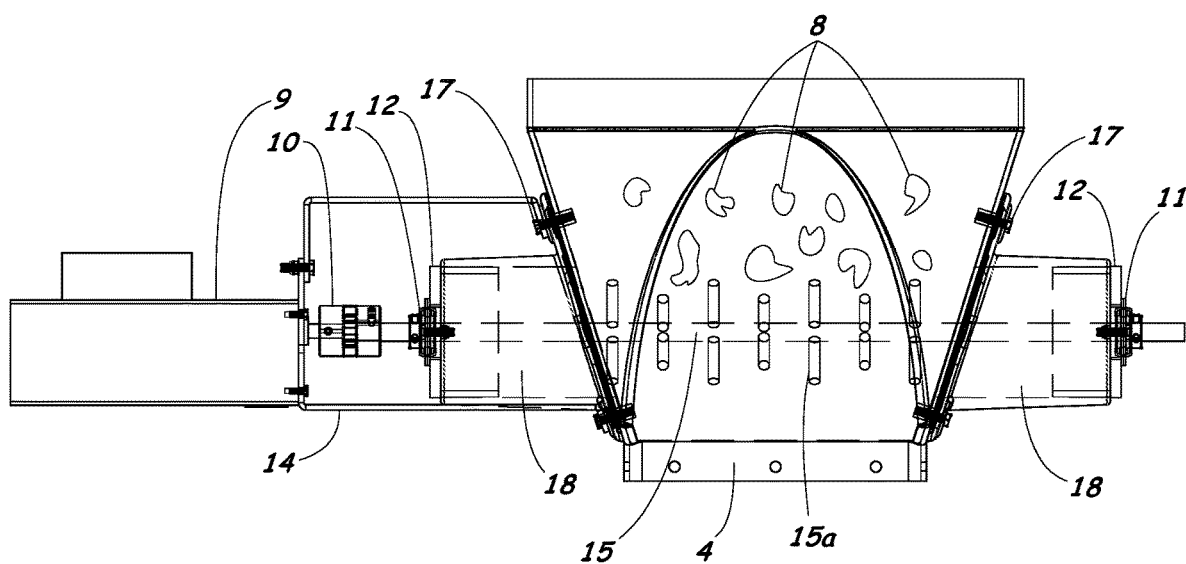
FIG. 2 is a detail view of the straight boot with the agitating mechanism according to the first embodiment of the present invention.

FIG. 2 shows the individual components that comprise the feed agitator mechanism 3 when installed on the straight boot 4. The gear reduced motor assembly 9 is connected to the feed agitator shaft 15 using a self aligning drive coupler 10. The feed agitator shaft 15 is inserted into the end bearing assembly 11 that is fastened to the mounting bracket cap 12. The mounting bracket cap 12 is inserted into the straight boot mount bracket 18 to secure the feed agitator shaft 15 to the straight boot mount bracket 18. The straight boot mount bracket 18 is attached to the straight boot 4 by using rubber well nuts 17 that are installed into the straight boot 4. The gear reduced motor assembly 9 is fastened to the motor mount plate 14 that is fastened to one of the straight boot mount brackets 18. The opposite side of straight boot 4 has a second straight boot mount bracket 18 fastened to the straight boot 4 using rubber well nuts 17 that are installed into the straight boot 4. A second mounting bracket cap 12 is inserted into the straight boot mount bracket 18. A second end bearing assembly 11 is attached to the mounting bracket cap 12 and attached to the feed agitator shaft 15 to complete the assembly.

Figure 3:
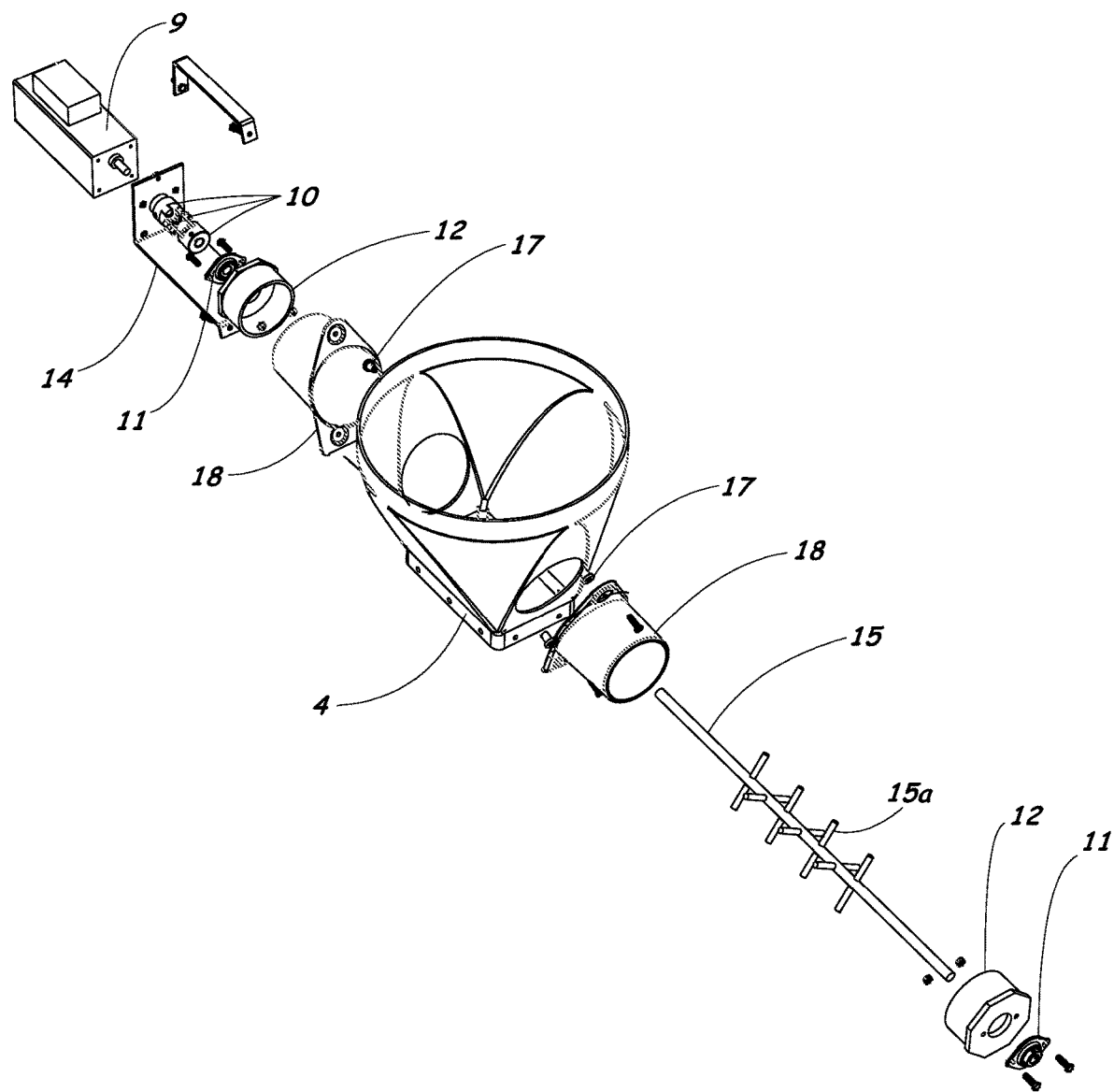
FIG. 3 is an exploded view of the straight boot and agitating mechanism according to the first embodiment.

FIG. 3 is an exploded view of the feed agitator mechanism 3 when installed on a straight boot 4. The individual components shown in FIG. 3 are described in the previous paragraphs.

The boot mount brackets 18 according to the first embodiment of the invention allow the installation of the feed agitator mechanism 3 on feed bins 1 that contain ground feed, without first emptying the feed bins 1. Furthermore, the boot mount brackets 18 allow the feed agitator shaft 15 to be inserted through the boot mount brackets 18. The feed agitator mechanism 3 can be operated using an independent gear reduced motor assembly 9 that allows installation onto a straight boot 4 without concern or connection to the auger or conveying device 7.

The combination of these features results in a much faster and efficient installation. Hence, the present invention provides a solution for installing the feed agitator mechanism 3 onto feed bins 1 that contain ground grain.

FIG. 4 illustrates how the specially designed straight boot mount bracket 18 is installed onto a straight boot 4. The installation is completed without disassembly of existing components that may be installed onto an existing feed bin 1. The first step is to place the straight boot mount bracket 18 on the end wall of the straight boot 4 using the lower bolts as a guide. The top holes in the straight boot mount bracket 18 are used as drill guides to drill holes into the straight boot 4 to receive the rubber well nuts 17. The straight boot mount 18 can be fastened to the straight boot 4 using bolts inserted into the rubber well nuts 17.

A hole saw can then be inserted into the inner diameter of the straight boot mount 18 to drill or cut a large hole into the straight boot 4 having a diameter D1. When the hole is cut, the ground feed in the bin 1 will flow out of the hole and into the straight boot mount 18 and pile onto the lower ledge 18L of the straight boot mount 18, but will stop flowing because of the ground feed angle of repose A. The angle of repose A is determined by the angle the ground feed forms with a horizontal surface as it piles up on itself during discharge. Typical ground grains have an angle of repose in the range of 45 degrees to upward of 80 degrees for ground feeds having high fat content.

A critical ratio of the straight boot mounting bracket 18 length L (particularly the length of the lower ledge 18L of the bracket 18) divided by the hole diameter D1 drilled into the straight boot 4 must exceed 0.36 for ground feed flow to stop free flowing from the hole drilled into the straight boot 4. Therefore, the present invention uses an L/D ratio of >0.36 in the design of the mounting brackets 18.

After the large hole with diameter D1 is drilled into the straight boot 4 end wall (using the straight boot mounting bracket 18 as a guide), the opposite side of the straight boot 4 can be completed in the same manner as the first by drilling or cutting a second hole having a diameter D2. The two straight boot mounting brackets 18 are secured in place prior to drilling the holes with diameters D1 and D2 in the end walls of the boot 4, and are ready to receive the feed agitator shaft 15 once the holes are drilled into the boot 4.

The feed agitator shaft 15 is inserted through the center of the straight boot mounting bracket 18, through the ground grain contained in the straight boot 4, and then through the opposite straight boot mounting bracket 18. The ends of the straight boot mounting brackets 18 are capped using a mounting bracket cap 12 with an end bearing assembly 11. The end of the feed agitator shaft 15 is secured to the end bearing assembly 11 and a self aligning drive coupler 10. The motor mount plate 14 is fastened to one of the straight boot mount brackets 18 and the gear reduced motor assembly 9. The gear reduced motor assembly 9 is connected to the feed agitator shaft using the self aligning drive coupler 10.

Second Embodiment—Angled Boot

An animal feed mechanism with a feed agitator assembly according to the second embodiment of the present invention will now be described with reference to FIGS. 5 to 8. The same reference numerals used in FIGS. 1 to 4 will also be used in FIGS. 5 to 8 along with a prime notation to indicate elements that generally correspond between the first and second embodiments.

As shown in FIG. 5, the angled boot 4' is connected directly to the unloader box 2' that contains the auger tube 6' and auger or conveying device 7'. The feed agitator mechanism 3' is attached to the angled boot 4' to mechanically agitate balls or clumps of feed 8' flowing inside of the feed bin 1' into the angled boot 4'. The feed agitator mechanism 3' includes a feed agitator shaft 15' with radial protrusions 15a' spaced along a length of the shaft 15'. Upon rotation of the shaft 15', the radial protrusions 15a' are also rotated with the shaft 15' to aid in breaking up balls or clumps of feed 8' within the boot 4'.

Figure 6:
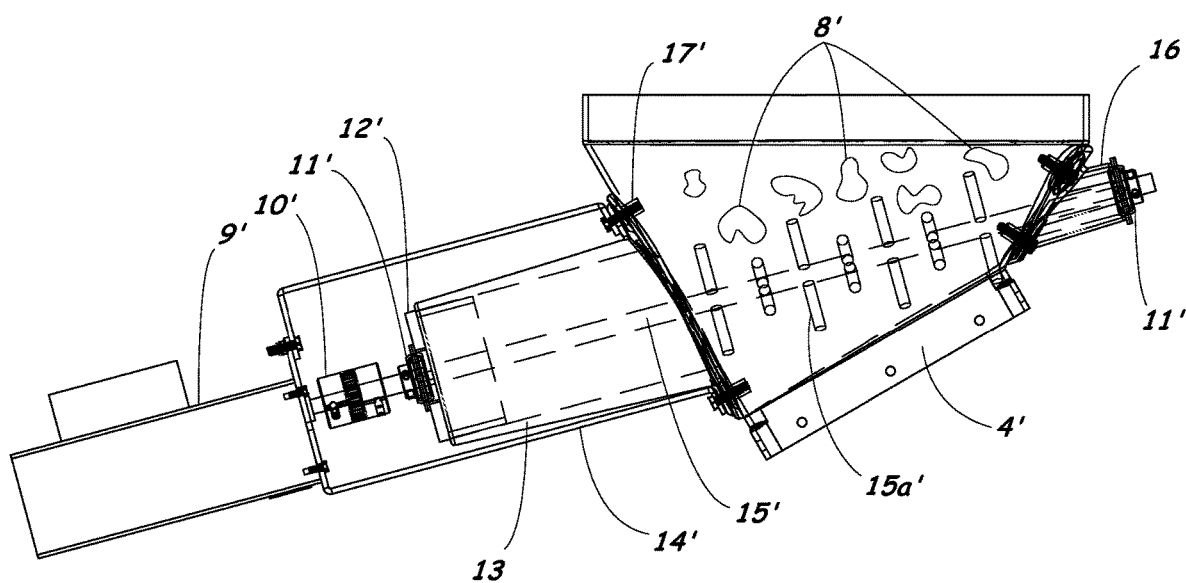
FIG. 6 is a detail view of the angled boot with the agitating mechanism according to the second embodiment of the present invention.

FIG. 6 shows the individual components that comprise the feed agitator mechanism 3' when installed on an angled boot 4'. The gear reduced motor assembly 9' is connected to the feed agitator shaft 15' using a self aligning drive coupler 10'. The feed agitator shaft 15' is inserted into the end bearing assembly 11' that is fastened to the mounting bracket cap 12'. The mounting bracket cap 12' is inserted into the lower angled boot mount bracket 13 to secure the feed agitator shaft 15' to the lower angled boot mount bracket 13. The lower angled boot mount bracket 13 is attached to the angled boot 4' by using rubber well nuts 17 that are installed into the angled boot 4'.

The gear reduced motor assembly 9 is fastened to the motor mount plate 14, which is fastened to the lower angled boot mount bracket 13. The opposite side of angled boot 4' has an upper angled boot mount bracket 16 fastened to the angled boot 4' using rubber well nuts 17 installed into the angled boot 4'. A second end bearing assembly 11 is attached to the upper angled boot mount bracket 16 and attached to the feed agitator shaft 15 to complete the assembly.

Figure 7:
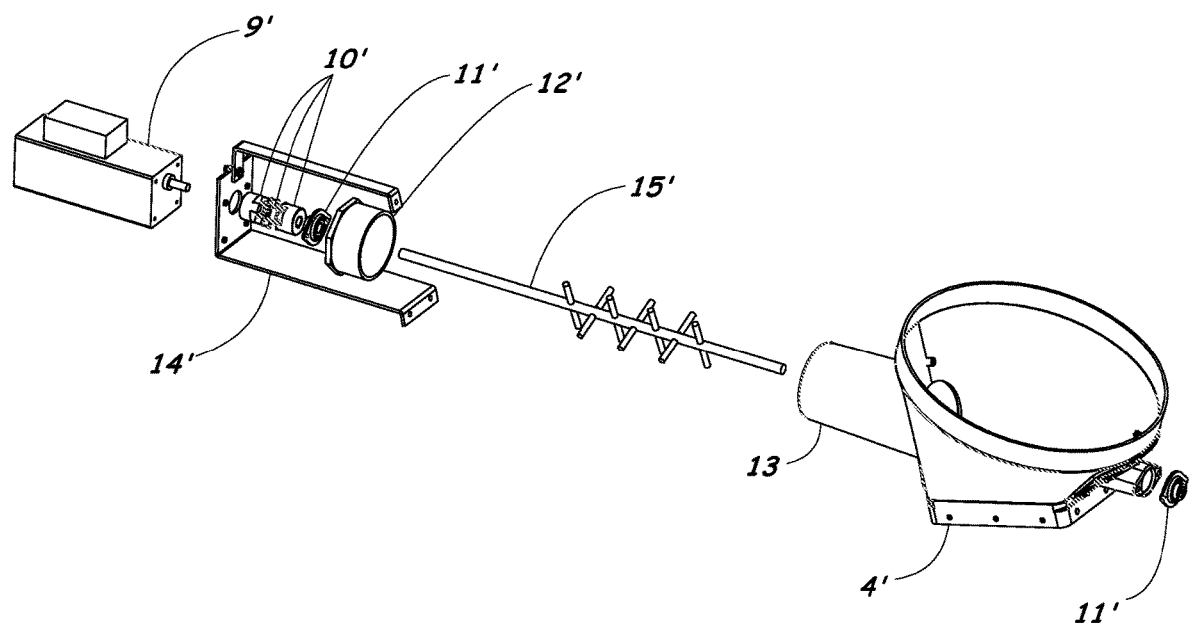
FIG. 7 is an exploded view of the angled boot and agitating mechanism according to the second embodiment.

FIG. 7 is an exploded view of the feed agitator mechanism 3' when installed on an angled boot 4'. The individual components shown in FIG. 7 are described above.

The boot mount brackets 13, 16 according to the second embodiment of the present invention allow the installation of the feed agitator mechanism 3' on a feed bin 1' that contains ground feed, without first emptying the bin 1'. The boot mount brackets 13, 16 allow the feed agitator shaft 15' to be inserted through the boot mount brackets 13, 16 and the holes cut in the end walls of the angled boot 4'. The feed agitator mechanism 3' can be operated using an independent gear reduced motor assembly 9' that allows installation onto the angled boot 4' without concern or connection to the auger or conveying device 7'.

The combination of these features results in a fast and efficient installation on feed bins 1' that have an angled boot 4'. Hence, the present invention provides a solution for installing the feed agitator mechanism 3' onto feed bins 1' that contain ground grain and that have different boot designs.

Figure 8:
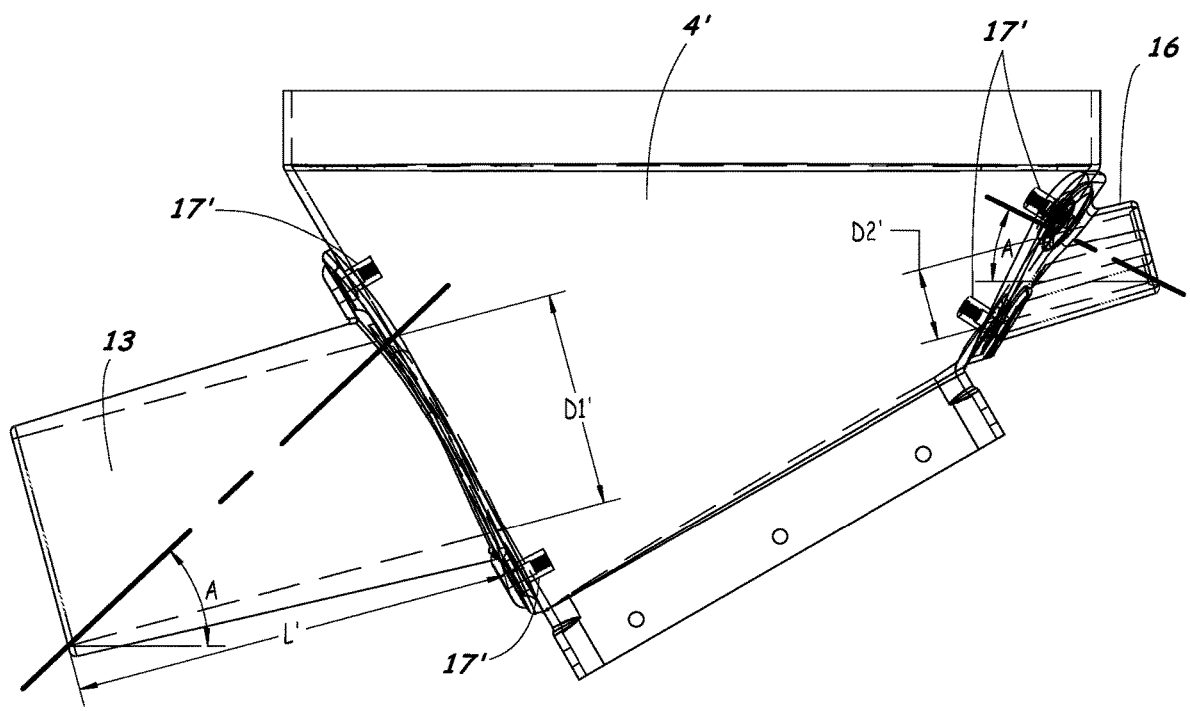
FIG. 8 is a detail view showing the agitator mounting system attached to the angled boot for installing the agitating mechanism in the second embodiment.

FIG. 8 illustrates how the specially designed angled boot mount bracket 13 is installed onto an angled boot 4'. The installation is completed without disassembly of existing components that may be installed onto an existing feed bin 1'. The first step is to place the angled boot mount bracket 13 on the long taper end wall of the angled boot 4' using the lower bolts as a guide. The top holes in the angled boot mount bracket 13 are used as drill guides to drill holes into the angled boot 4' to receive the rubber well nuts 17'. The angled boot mount 13 can be fastened to the angled boot 4' using bolts inserted into the rubber well nuts 17'.

A hole saw can be inserted into the inner diameter of the angled boot mount 13 to drill or cut a large hole into the angled boot 4' having a diameter D. When the hole is cut, the ground feed in the bin 1' will flow out of the hole and into the angled boot mount 13 and pile onto the lower ledge 13L of the angled boot mount 13, but will stop flowing because of the ground feed angle of repose A.

A critical ratio of the length of the mounting bracket 13 length L' for the angled boot 4' (particularly the length of the lower ledge 13L of the bracket 13) divided by the hole diameter D1' drilled into the angled boot 4', if the angled boot 4' extends at a 30 degree angle, must exceed 0.93 for ground feed flow to stop free flowing from the hole drilled into the angled boot. Therefore, this embodiment of the present invention for use with the 30 degree angled boot 4' uses an L/D ratio of >0.93 in the design of the mounting bracket 13.

After the large hole with diameter D1' is drilled or cut into the end wall of the angled boot 4' (e.g., using the angled boot mounting bracket 13 as a guide), the opposite side of the angled boot 4' can be completed in a similar manner as the first by drilling or cutting a second hole having a diameter D2' and using an upper angled boot mount bracket 16. The angled boot mounting bracket 13 and the upper angled boot mount bracket 16 are secured in place prior to drilling the holes with diameters D1' and D2' in the end walls of the boot 4', and are ready to receive the feed agitator shaft 15' once the holes are drilled or cut into the boot 4'.

The feed agitator shaft 15' is inserted through the center of the angled boot mounting bracket 13, through the ground grain contained in the angled boot 4', and then through the opposite upper angled boot mount bracket 16. The end of the angled boot mounting bracket 13 is capped using a mounting bracket cap 12' with an end bearing assembly 11'. The end of the upper angled boot mounting bracket 16 is capped using an end bearing assembly 11'. The end of the feed agitator shaft 15' is secured to the end bearing assembly 11' and a self aligning drive coupler 10'. The motor mount plate 14' is fastened to the angled boot mount brackets 13 and the gear reduced motor assembly 9'. The gear reduced motor assembly 9' is connected to the feed agitator shaft 15' using the self aligning drive coupler 10'.

The present invention has been described and illustrated with reference to a mounting system for installing a feed agitator mechanism in a funnel-shaped boot or housing between a feed bin and an unloader/conveyor device. However, the invention will also have other applications, such as mounting various mechanisms in the sidewalls of bins, hoppers, or other containers that are generally defined by housings with a wall for containing granular material. For example, the invention can be used for installing various mechanisms, such as agitators, augers, sensors, and so forth in the sidewall of a grain bin or other device having a housing with a wall. The mounting system includes a structure with a lower ledge attached to the wall of the housing to provide a shelf for stopping granular material from free flowing out of an installation opening cut in the wall of the housing. The installation opening is cut in the housing after the structure with the lower ledge is attached to the housing. The lower ledge is located below the installation opening and extends outwardly from the wall at least far enough to allow a slope of granular material that flows out of the installation opening onto the lower ledge to equal an angle of repose of the granular material, thereby stopping the free flow of granular material from the housing. The mounting system thus provides a solution to install a mechanism in the sidewall of a housing without first emptying the granular material contained in the housing.

While the invention has been specifically described in connection with specific embodiments thereof, it is to be understood that this is by way of illustration and not of limitation, and the scope of the appended claims should be construed as broadly as the prior art will permit.

What is claimed is:

1. An animal feed mechanism for handling feed, comprising:
    a feed bin having a bottom opening;
    a funnel-shaped boot connected to the feed bin and arranged to receive feed from the bottom opening of the feed bin, said funnel-shaped boot comprising first and second end walls;
    a conveying device arranged below the funnel-shaped boot to convey feed that flows from the feed bin through the funnel-shaped boot;
    an agitator assembly for breaking up clumps of feed to prevent blockage from occurring, said agitator assembly comprising a feed agitator shaft with radial protrusions that extend to a first diameter; and
    a mounting system for mounting the feed agitator assembly to the funnel-shaped boot, said mounting system comprising a first boot mount bracket attached to the first end wall of the funnel-shaped boot, a first installation opening through the first end wall of the funnel-shaped boot, said first installation opening being large enough to insert said feed agitator shaft with radial protrusions through the first end wall and into the funnel-shaped boot, and said first boot mount bracket comprises a lower ledge located below said first installation opening and extending from said first end wall a sufficient length to stop ground feed from free flowing from the first installation opening so that said mounting system can be installed to the funnel-shaped boot without first emptying the feed bin.

2. The animal feed mechanism according to claim 1, wherein said funnel-shaped boot comprises a straight boot configured to mate with a horizontal conveying device.

3. The animal feed mechanism according to claim 2, wherein a ratio of the length of the lower ledge to a diameter of the first installation opening exceeds 0.36.

4. The animal feed mechanism according to claim 1, wherein said funnel-shaped boot comprises an angled boot configured to mate with an inclined conveying device.

5. The animal feed mechanism according to claim 1, wherein said funnel-shaped boot comprises an angled boot configured to mate with a conveying device inclined at an angle of approximately 30 degrees relative to horizontal, and wherein a ratio of the length of the lower ledge to a diameter of the first installation opening exceeds 0.93.

6. The animal feed mechanism according to claim 1, wherein said first boot mount bracket comprises an inner diameter, and said first installation opening comprises a circular opening with a diameter that generally aligns with the inner diameter of the first boot mount bracket.

7. The animal feed mechanism according to claim 1, further comprising a second boot mount bracket attached to the second end wall of the funnel-shaped boot, a second installation opening cut through the second end wall, said second installation opening being large enough to insert a distal end of said feed agitator shaft.

8. The animal feed mechanism according to claim 7, wherein said second boot mount bracket comprises an inner diameter, and said second installation opening comprises a circular opening with a diameter that generally aligns with the inner diameter of the second boot mount bracket.

9. The animal feed mechanism according to claim 8, wherein said second boot mount bracket comprises a lower ledge extending from said second end wall a sufficient length to stop ground feed from free flowing from the second installation opening so that said mounting system can be installed to the funnel-shaped boot without first emptying the feed bin.

10. The animal feed mechanism according to claim 1, wherein said mounting system further comprises a first mounting bracket cap on the first boot mount bracket and a proximal end bearing assembly fastened to the first mounting bracket cap for supporting a proximal end of said feed agitator shaft.

11. The animal feed mechanism according to claim 9, wherein said mounting system further comprises a second mounting bracket cap on the second boot mount bracket and a distal end bearing assembly fastened to the second mounting bracket cap for supporting a distal end of said feed agitator shaft.

12. The animal feed mechanism according to claim 1, further comprising a drive motor coupled to a proximal end of the feed agitator shaft to rotate the feed agitator shaft about a longitudinal axis.

13. A method of installing a feed agitator assembly to an animal feed mechanism, comprising:
providing a feed bin having a bottom opening, a funnel-shaped boot connected to the feed bin and arranged to receive feed from the bottom opening of the feed bin, said funnel-shaped boot comprising first and second end walls, and a conveying device arranged below the funnel-shaped boot to convey feed out of the funnel-shaped boot;
attaching a first boot mount bracket to said first end wall, said first boot mount bracket having a first lower ledge;
cutting a first hole through said first end wall of the funnel-shaped boot with the first lower ledge positioned below said first hole and extending outwardly from said first end wall a sufficient length to stop ground feed from free flowing from the first hole after the first hole is cut;
inserting a feed agitator shaft with radial protrusions through the first hole so that the radial protrusions are positioned between the first and second end walls, and a proximal end of the feed agitator shaft extends out of the first hole;
supporting the proximal end of the feed agitator shaft with a proximal end bearing assembly fastened to a first mounting bracket cap on the first boot mount bracket; and
coupling a drive motor assembly to the feed agitator shaft to rotate the feed agitator shaft about a longitudinal axis to break up clumps of feed within the funnel-shaped boot to prevent blockage from occurring.

14. The method according to claim 13, wherein said funnel-shaped boot comprises a straight boot configured to mate with a horizontal conveying device.

15. The method according to claim 14, wherein a ratio of the length of the first lower ledge to a diameter of the first hole exceeds 0.36.

16. The method according to claim 13, wherein said funnel-shaped boot comprises an angled boot configured to mate with an inclined conveying device.

17. The method according to claim 13, wherein said funnel-shaped boot comprises an angled boot configured to mate with a conveying device inclined at an angle of approximately 30 degrees relative to horizontal, and wherein a ratio of the length of the first lower ledge to a diameter of the first hole exceeds 0.93.

18. The method according to claim 13, wherein said first boot mount bracket comprises an inner diameter, and said first hole comprises a circular opening with a diameter that generally aligns with the inner diameter of the first boot mount bracket.

19. The method according to claim 13, further comprising:
attaching a second boot mount bracket to said second end wall, said second boot mount bracket having a second lower ledge;
cutting a second hole through said second end wall of the funnel-shaped boot with the second lower ledge positioned below said second hole and extending outwardly from said second end wall a sufficient length to stop ground feed from free flowing from the second hole after the second hole is cut;
extending a distal end of the feed agitator shaft out of the second hole; and
supporting the distal end of the feed agitator shaft with a distal end bearing assembly fastened to a second mounting bracket cap on the second boot mount bracket.

* * * * *